United States Patent [19]

Ohmori

[11] 4,091,399
[45] May 23, 1978

[54] MIRROR DRIVING DEVICE FOR A SINGLE LENS REFLEX CAMERA

[75] Inventor: Sachio Ohmori, Yokohama, Japan

[73] Assignee: Nippon Kogaku K.K., Tokyo, Japan

[21] Appl. No.: 640,894

[22] Filed: Dec. 15, 1975

[30] Foreign Application Priority Data

Dec. 28, 1974 Japan .................................. 49-1294

[51] Int. Cl.² ............................................. G03B 19/12
[52] U.S. Cl. .................................... 354/152; 354/156
[58] Field of Search ........................ 354/152, 153, 156

[56] References Cited

U.S. PATENT DOCUMENTS

| 2,952,197 | 9/1960 | Goshima | 354/153 |
| 3,653,311 | 4/1972 | Sato | 354/156 |
| 3,738,246 | 6/1973 | Sato | 354/152 |
| 3,894,294 | 7/1975 | Blinow | 354/152 X |

Primary Examiner—Edna M. O'Connor
Attorney, Agent, or Firm—Shapiro and Shapiro

[57] ABSTRACT

The invention presents a mirror driving device for a single lens reflex camera. The energy during the ascension of the mirror is absorbed to utilize it as the energy for the descent of the mirror, and then this energy is substantially absorbed to utilize it as the energy for the ascending operation at the phototaking step during the lowering operation of the mirror. The energy loss due to the friction is supplemented from an external source for efficiently processing the ascending and descending operations.

10 Claims, 11 Drawing Figures

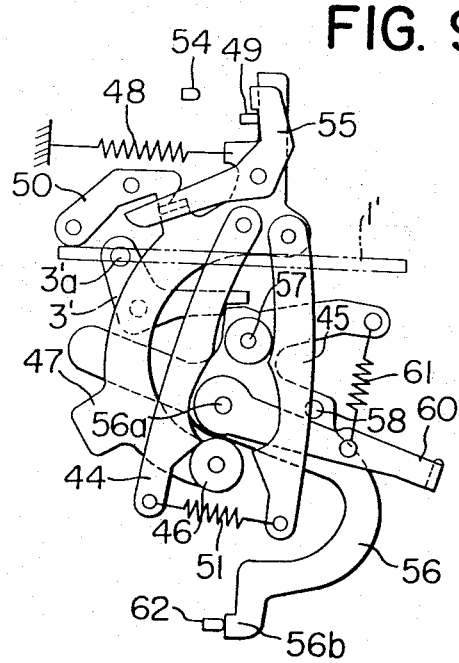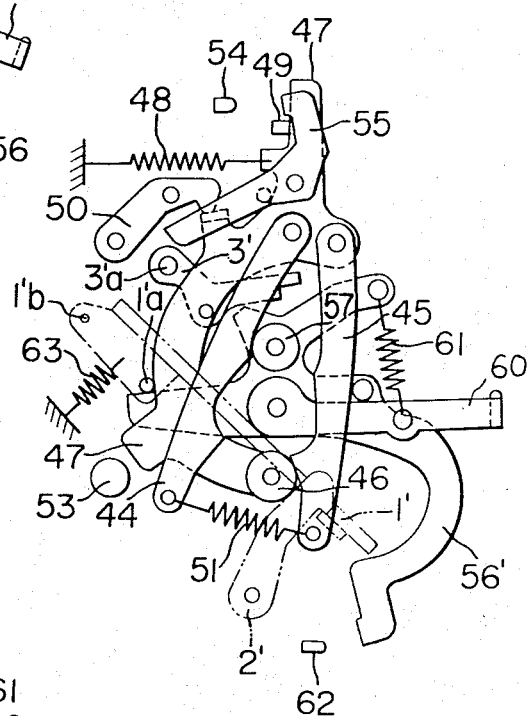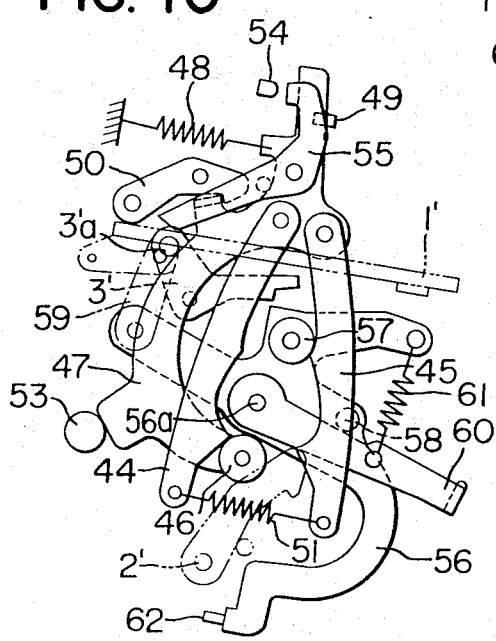

MIRROR DRIVING DEVICE FOR A SINGLE LENS REFLEX CAMERA

BACKGROUND OF THE INVENTION

1. Field of the Invention

This invention relates to a single lens reflex camera, and is particularly directed to a mirror driving device in a single lens reflex camera.

2. Description of the Prior Art

According to the prior art, in a single lens reflex camera, a driving spring is provided which stores energy for the operations of moving the mirror up and down. By releasing a locking key mirror-up and mirror-down operations are performed with the aid of the stored energy of the spring. In such prior art devices, it is usual to provide a brake mechanism utilizing an elastomer or rubber or an air damper for absorbing the kinetic energy of the spring driving mirror when the mirror is stopped. However, the kinetic energy of the mirror is at its maximum just prior to the cessation of its motion. Shock and noise are inordinately large. Moreover, the kinetic energy is lost as frictional energy or thermal, and substantial energy is required to re-energize the driving spring when charging the mirror.

SUMMARY OF THE INVENTION

The object of the invention is to overcome the described limitation of the prior art devices, to provide a mirror driving device which requires a small amount of energy for charging or winding it up, and to furnish a device which furnishes a minimum of shock and noise when the mirror is moved.

According to the invention, the energy of mirror-up is absorbed to utilize it as the energy for mirror-down during the ascending operation of the mirror, and then this energy is substantially absorbed to utilize it as the energy for the mirror-up operation at the phototaking step during the descending operation of the mirror. In practice, however, the energy loss is unavoidable, it is necessary to supplement the energy from the external, of which the amount is to compensate the loss of energy, for efficiently prosecuting the mirror-up and mirror-down operation.

BRIEF DESCRIPTION OF THE DRAWINGS

FIGS. 7 to 10 show side views of a mirror box in accordance with a fourth embodiment of the invention, FIGS. 7 to 10 corresponding to FIGS 3 to 6, respectively; and FIG. 11 is a side view of a mirror box in accordance with a fifth embodiment of the invention.

DESCRIPTION OF THE PREFERRED EMBODIMENTS

Figure 1:
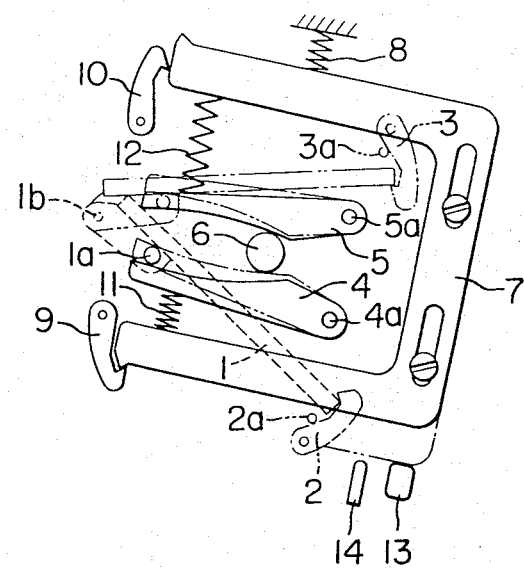
FIG. 1 is a side view of a mirror box in accordance with a first embodiment of the invention.

Referring to FIG. 1, a conventional mirror 1 shown in broken lines rotates about the shaft 1b and has a pin 1a. The mirror 1 is prevented from upward rotation by a first mirror key 2, and is releasably retained at a position inclined 45° relative to the optical axis. The first mirror key 2 is normally biased to counterclockwise direction, and is stopped by the stopper 2a. A second mirror key 3 is used for retaining the mirror at its uppermost position, and is normally biased to the clockwise direction and is stopped by the stopper 3a.

A first driving lever 4 is rotatable about a shaft 4a fixed to the side wall of the mirror box, the side wall corresponding to the paper of the drawing. The upper side surface of the lever 4 abuts on the pin 1a. A second driving lever 5 is rotatable about a shaft 5a fixed to the side wall of the mirror box, and the lower side surface of the lever 5 abuts on the pin 1a.

A stopper 6 is fixed to the side wall of the mirror box and acts to stop the first and second driving levers 4 and 5.

An energy supplementing lever 7 is movable obliquely in the up and down directions, and is biased downwardly by a compression spring 8. The spring 8 is hereinafter referred to as the third biasing spring. A first key 9 is normally biased in a counterclockwise direction to prevent the lever 7 from moving downwardly. A second key 10 is normally biased in a clockwise direction to prevent the lever 7 from moving upwardly. A first biasing compression spring 11 is positioned between the lever 7 and the first driving lever 4 and a second biasing spring 12 is positioned between the lever 7 and the second driving lever 5. A stopper 13 is fixed to the side wall of the mirror box to limit the movement of the lever 7. A biasing lever 14 is supported at the side of the camera to work the lever 7 upwardly in association with the shutter charge and upon completion of the shutter charge, the lever 14 enables restoring the lever 9 to its original position.

The state of the elements at their solid line and broken line positions, respectively, as shown in FIG. 1, shows where the shutter charge is completed. From this state, when the shutter is released, the first mirror key 2 rotates in the clockwise direction to release the mirror 1. The first driving lever 4 being biased upwardly by the first biasing spring 11 pushes against the pin 1a to elevate the mirror 1. In this ascending operation of the mirror 1, the first driving lever 4 stops upon impact with the stopper 6. With respect to this impact, since the moment of inertia of the first driving lever 4 is small, and the extent of motion is very small, the kinetic energy of the first driving lever 4 before the impact is commensurately small. As a result the shock and noise at such impact are so small as to the almost imperceptible.

Next, the pin 1a departs from the first driving lever 4 and begins to engage the second driving lever 5. Then, the mirror 1 pushes against the second biasing spring 12 and continues its ascension until it is stopped by the second mirror key 3. At this elevated position, the mirror has rotated 45° from its original stop position. The kinetic energy of the mirror 1 has been converted into the potential energy of the second biasing spring 12 and decelerates the mirror 1. Of course, there is a loss of energy due to friction and the amount of this potential energy is less than the kinetic energy released from the mirror 1 by the amount of energy lost because of friction. When the mirror 1 is retained at its elevated position, or when the ascent is completed, the mirror 1 and the driving levers 4 and 5 are located at the two-dot line positions shown in FIG. 1.

Then, after a predetermined time has passed, and before the downward movement is begun, the energy supplementing lever 7 is released from engagement with the first key 9. Due to the force of the third biasing spring 8, the lever 7 is moved, until such lever engages the stopper 13 and simultaneously is hooked by the second key 10. A portion of the lever 7 at this stage is shown in dotted line. By such action of the parts, the energy stored in the third biasing spring 8 is converted into potential energy for the second biasing spring 12 so that the energy of the latter spring is imparted to the mirror descending operation.

As previously indicated, a certain amount of potential energy is stored in the second biasing spring 12 during the upward motion, whereby the amount of potential energy to be supplemented to the second biasing spring from the third biasing spring is small.

Then, the second mirror key 3 is released, and the pin 1a is pushed by the force of the second biasing spring 12 and the mirror 1 is lowered. In this descending operation, the second driving lever 5 impacts on the stopper 6 and stops there. The shock and noise at this impact are very small and almost imperceptible. Then the pin 1a leaves the second driving lever 5 and begins engagement with the first driving lever 4. Thereafter, the mirror continues its downward motion while compressing the first biasing spring 11 until the mirror engages the first mirror key 2 after its 45° upon descending travel of 45° and having been restored to the shown original broken line position.

It will be apparent from the foregoing that in the downward movement the kinetic energy of the mirror 1 is converted into the potential energy of the first biasing spring 11 and deceleration of the mirror 1 in its descending travel. Also, it will be apparent that as with the descending operation, the amount of the potential energy of the first biasing spring 11 is less than the kinetic energy of the mirror.

Thus, after phototaking one frame, the mirror is retained at its lowered position.

For phototaking the next frame or, when the shutter charge (or the film winding) is completed, the second movement-preventing key 10 is released from interlocking relation with the shutter charge operation, the biasing lever 14 is moved to upward position and the supplementing lever 7 is restores to the solid line position shown in FIG. 1. Consequently, the first biasing spring 11 is further compressed, and the energy needed to supplement the energy necessary for the mirror-up operation and the shutter charge is completed. At this stage, a certain amount of potential energy has also been stored in the first biasing spring 11 by the previous downward movement, whereby the supplemented potential energy imparted to such spring by the biasing lever 14 need be but a small amount. The subsequent operation is the same as previously described.

Figure 2:
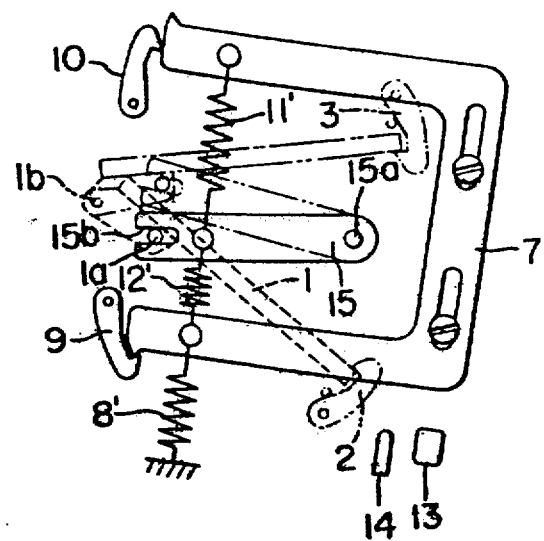
FIG. 2 is a side view of a mirror box in accordance with a second embodiment of the invention.

Referring to FIG. 2, in this embodiment, the first and second driving levers of the first embodiment are made as a unitary part. The same reference numerals are assigned to the similar elements except for the driving lever and the biasing springs. The first, second and third biasing springs are respectively assigned reference numerals 11', 12', and 8', all of the springs being compression springs. The driving lever 15 has a slot 15b for receiving therein the pin 1a for the mirror. In the mirror-up operation, the first mirror key 2 is released from the state of FIG. 2, causing the driving lever 15, and therefore the mirror 1, to be rotated by the pulling force of the first biasing spring 11'. During this phase of the operation, the second biasing spring 12' is put in tension so that the movement of the mirror is dampened or braked. Thus, the first biasing spring 11' would accelerate movement of the mirror but for the force of the second biasing spring 12'. The force of the latter becomes equal to the force of the former, which is the neutral state. By passing this neutral position, the force of the second biasing spring 12' overcomes the force of the first biasing spring 11', and the mirror is decelerated. The supplementing lever 7 will vary this neutral position between the mirror-up and mirror-down operations, taking the frictional energy loss into consideration. In ascending operation of the mirror, the energy supplementing lever 7 is moved so as to locate its position where the neutral position is deviated from the middle point of the total travelling angle of the mirror toward the uppermost mirror position. In such uppermost position, the lever is stopped by first key 9. In mirror-down operation, the lever 7 is moved to locate the position in which the lever is engaged with and stopped by the second key 10 where the neutral position shifted from the middle point of the total travelling angle of the mirror toward the lowermost position of the mirror.

In the embodiment of FIG. 2, it is not necessary to include an element corresponding to the stop 6 shown in the first embodiment. The driving lever 15 is provided for increasing the freedom of design but it is not necessary. When the lever 15 is omitted, the opposite ends of the first 11' and second 12' biasing springs, respectively, are hooked on the pin 1a of the mirror.

In the embodiment of FIGS. 3 to 6, the first and second biasing springs of the first embodiment are made as a unitary or single part. The elements common to those of FIGS. 1 and 2 are given the same reference characters. The first driving lever 24 and the second driving lever 25 are rotatably supported on the energy supplementing lever 27. The lever 27, which is rotatable about the shaft 27a, has a stop 26 thereon located between the levers 24 and 25. The reference character 28 designates the third biasing spring, 29 the first key, 30 the second key and 31 the single biasing spring which corresponds to the first and second biasing springs in the first and second embodiments. The spring 31 is connected to the first and second driving levers at 24b and 25b, respectively. The third biasing spring 28 and the biasing spring 31 are tension springs, respectively. The reference character 33 designates the stop for the energy supplementing lever 27, and 34 is the biasing lever provided at the camera body.

Figure 3:
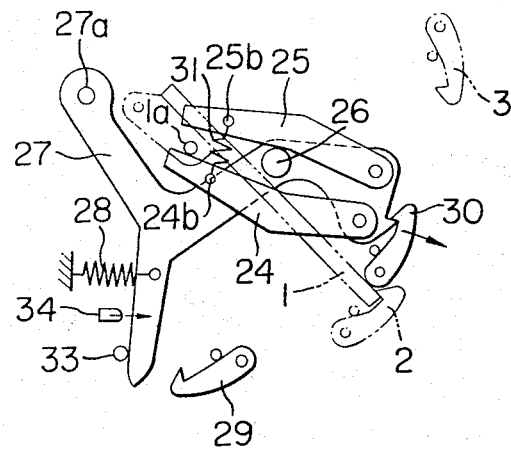
FIGS. 3 to 6 show side views of a mirror box in accordance with a third embodiment of the invention, FIG. 3 showing the state of the device before the shutter is charged, FIG. 4 where the shutter charge is completed, FIG. 5 where the ascension of the mirror is finished, and FIG. 6 the condition where the energy for the operation of the descending mirror is supplemented.

FIG. 3 shows the state where the shutter is not yet charged, or the wind-up lever has not been operated. For phototaking, the charging of the shutter is performed by the operation of, for example, the wind-up lever, the second key 30 is rotated in the direction of the arrow to enable the supplementing lever 27 to rotate, and then the biasing lever 34 is moved in the direction of the arrow. The lever 27 rotates counterclockwise against the force of the third biasing spring 28 and is engaged with the first key 29. In this instant, the supporting point 24b of the biasing spring 31 on the first driving lever 24 moves close to the pin 1a so that the lever 24 scarcely moves. The second driving lever 25, however moves together with the supplementing lever 27 as the lever 25 contacts with the stop 26 so that the biasing spring 31 has tension applied thereto to increase its potential energy for the mirror-up motion.

Figure 4:
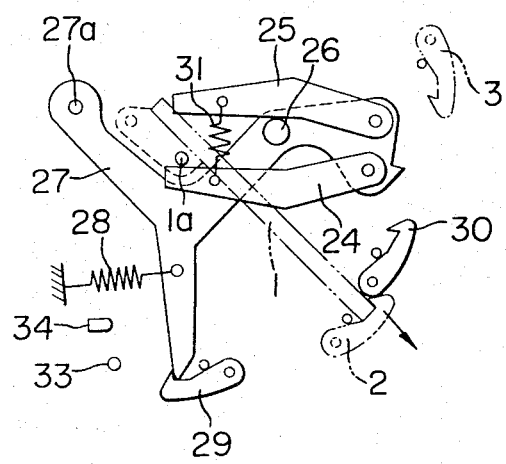
Figure 5:
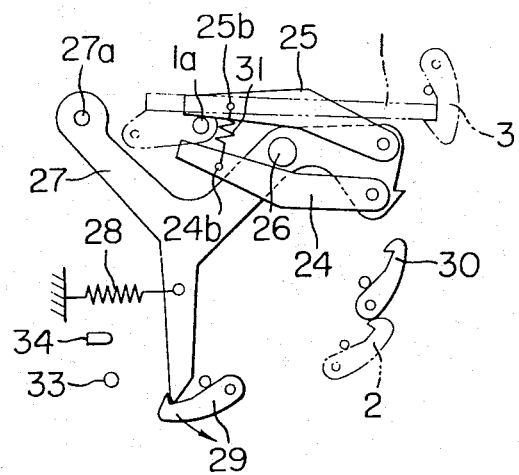

FIG. 4 shows the completion of this shutter charging operation. The ascending procedure of the mirror is quite similar to that in the first embodiment, but the potential energy of the biasing spring 31 is converted into the kinetic energy of the mirror 1 through the driving lever 24 and during the ascending movement of the mirror 1 this kinetic energy is stored as the potential energy of the one and the same biasing spring 31 through the second driving lever 25, which is the characteristic feature of the embodiment. FIG. 5 shows the state where the ascending operation of the mirror is completed.

Before the descending operation of the mirror is initiated, the first key 29 is rotated in the direction of the arrow (FIG. 5) and is released from engagement with the lever 27. The lever 27 is restored to its before-shutter charging state by the biasing force of the third biasing spring 28. In this state, the supporting point 25b for the spring 31 on the lever 25 is close to the pin 1a for the mirror so that the lever 25 scarcely moves. On the other hand, the supporting point 24b on the lever 24 is moved together with the lever 27 as the lever 24 contacts the pin 26, and the spring 31 is placed in tension so as to increase the downward movement potential energy.

Figure 6:
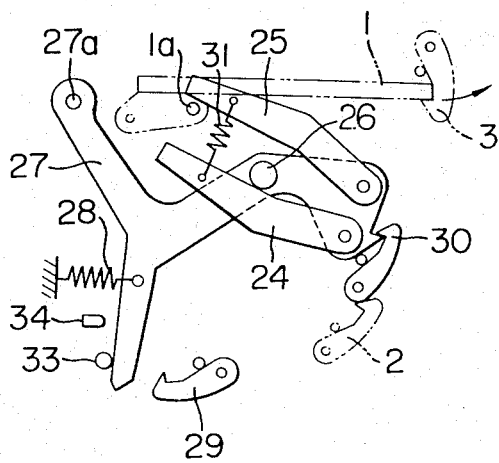

In other words, as the potential energy of the third biasing spring 28 is initiated when the shutter charging operation is made, and until the mirror is lowered, this energy is transferred to the biasing spring 31 from the spring 28. The finished state is shown in FIG. 6. The second mirror key 3 is rotated in the direction of the arrow to release from the mirror for downward movement until the mirror is engaged with the first mirror key 2. When the lowering operation is completed, all elements are restored to their respective positions as shown in FIG. 3, and one-frame phototaking operation is finished. Next, explanation will be made on an automatic stop operation. In phototaking lenses of the type of automatic stop operation, there are the cases where the stop blades are normally biased to small aperture size, and where the stop blades are normally biased toward fully open aperture size. In the former case, the stop blades are normally retained at their fully-open position by a biasing member provided at the camera, and when the shutter is released, the biasing force of the biasing member is released so as to obtain a predetermined stop value. In the latter case, with the aid of the biasing member provided at the camera, the stop blades are operated to obtain a predetermined stop value only when the shutter is released. Consequently, in case of the automatic stop operation, a further operation is required to interlock the operation of the biasing member provided at the camera.

Figure 7:
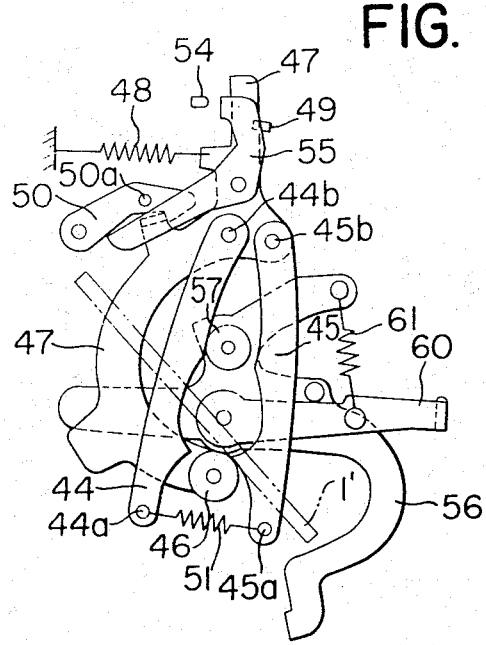
Figure 8:
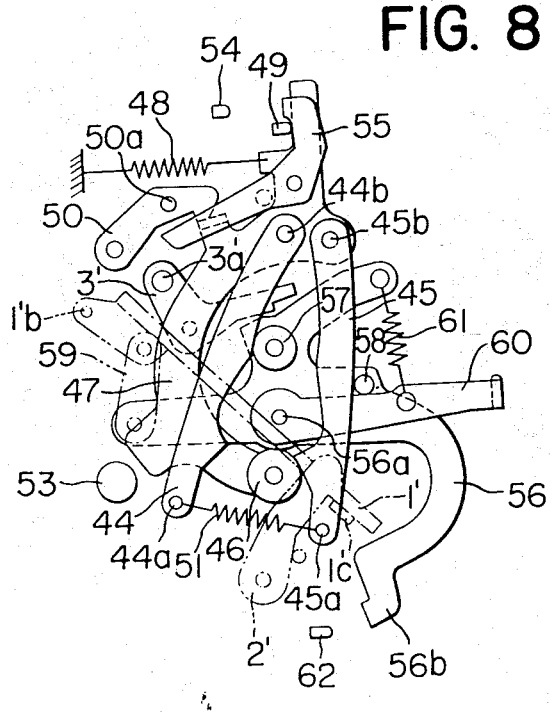

FIGS. 7 to 10 show an embodiment in which the automatic stop operation of the former type is adapted so that the stop blades are normally biased toward a small aperture size. The elements common to the first, second and third embodiments bear the same reference characters. In FIG. 8, the first mirror key 2' is normally biased in a clockwise direction so that it is engaged with the projection 1'c provided on the mirror body 1'. The first driving lever 44 and the second driving lever 45 are each rotatably supported on the energy supplementing lever 47 as the same as in the third embodiment. The lever 47 is rotatably pivoted at one end 46, such end serving as a stop for the first and second driving levers 44 and 45. The third biasing spring is shown at 48 and the first key 49 is moved perpendicularly to the plane of the paper. As shown, 50 is the second key, 51 is the biasing spring similar to that shown in the third embodiment, 53 is the stop for the energy supplementing lever 47, and 54 is the biasing lever provided on the camera body. A lever 55 is rotatably mounted on the lever 47 for releasing the second key, and the lever 55 is rotated at the beginning of the movement of the biasing lever 54 to release the second key 50.

A lever 56 is interlocked to operate with the movement of the mirror 1. The lever 56 is provided with pins 57 and 58, the former being in the form of a roller for engagement by the levers 44 and 45, the latter engaging a stop 60 as shown in FIG. 8, a mirror interconnecting member 59 connects the mirror body 1' with the lever 56. The mirror body 1', the lever 56 and the member 59 are interlocked and together correspond to the mirror 1 in the first, second and third embodiments. The stop lever 60 is pivoted about the fixed shaft 56a together with the lever 56 and normally is biased counterclockwise by the spring 61 connected between the mirror interlocking lever 56 and the stop lever 60. The shutter actuating lever 62 is located for engagement by the rotatable lever 56. The second mirror key 3' is normally biased in the clockwise direction, and has the pin 3'a for engagement by the energy supplementing lever 47 so as to engage with the mirror interlocking lever 56. The biasing spring 51, the third biasing spring 48 and the type 61 are of the tension spring. At the state of FIG. 7, the shutter charge is operated. For clarity in illustration FIGS. 7 and 9 show only the necessary elements.

When the biasing lever 54 is moved to the right it engages one end of the second key release lever 55 which in turn is rotated in a clockwise direction causing the other end of the lever 55 to engage the pin 50a of the second key 50 to rotate the second key counterclockwise and thereby release the energy supplementing lever 47. Then by moving the biasing lever 54 the lever 47 is rotated clockwise together with the lever 55 and stopped by the first key 49. By the rotation of the energy supplementing lever 47 the first driving lever 44 rotates clockwise with the pin 57 as its supporting point, and the second driving lever 45 is rotated clockwise as the pin 58 as its supporting point. The lengths of the arms from the point 57 to the points 44a and 45a, where the biasing spring 51 is connected are longer with respect to the first driving lever 44 than with respect to the second driving lever 45, and the lengths of the arms from the point 57 to the supporting shafts 44b and 45b on the energy supporting lever 47 are longer with respect to the second driving lever 45 than with respect to the first driving lever 44 so that the distance between the points 44a and 45a is increased and the biasing force of the biasing spring 51 is further increased. This state is shown in FIG. 8.

Then the shutter is released, whereupon the first mirror key 2' is released, and the first driving lever 44 biased by the biasing spring 51 becomes rotatable counterclockwise with the shaft 44b as its center of rotation. This biasing force causes the roller 57 to rotate the mirror interlocking lever 56 clockwise around the shaft 56a, and the mirror connecting member 59 moves substantially to its uppermost position to raise the mirror body 1'. In the ascension of the mirror body 1', the first driving lever 44 impacts on the stop 46, as previously described in the first, second and third embodiments, and the roller 57 moves away from the first driving lever 44 to press against the second driving lever 45. When the mirror body 1' arrives at its uppermost position, the second mirror key 3' rotates clockwise to stop the mirror interlocking lever 56.

By the rotation of the mirror interlocking lever 56 the pin 58 engages with the stop lever 60 so that the lever 60 rotates together with the mirror interlocking lever 56. Consequently, the stop of the phototaking lens is stopped down to a predetermined value by the biasing force on the lens side. This biasing force acts to accelerate the rotation of the mirror interlocking lever 56.

Further, at the end period of the raising motion of the mirror, one end 56b of the mirror interlocking lever 56 presses the shutter actuating lever 62 (FIG. 9) to initiate the running of the shutter.

Then, after a predetermined time has passed and before the actuation of the device for descent of the mirror, the first key 49 is released and the energy supplementing lever 47 rotates counterclockwise. At the end of this rotation, the lever 47 abuts with the pin 3'a of the second mirror key to rotate the pin 3'a counterclockwise to release the mirror interlocking lever 56. Consequently, the mirror interlocking lever 56 is rotated counterclockwise by the second driving lever 45 receiving the biasing force of the spring 51 so that the mirror connecting member 59 is lowered to cause the mirror body 1' to descend, as shown in FIG. 10.

The time to release the second mirror key 3' is different from that in the first, second and third embodiments. The second mirror key 3' is released before the completion of the transfer of the supplemented energy for the descent of the mirror from the third biasing spring 48 to the biasing spring 51. Since, the moment of inertia of the lever 47 is smaller than the moment of inertia of the mirror system comprising the mirror body 1', the connecting member 49, the interlocking lever 56 and stop lever 60, the time required for releasing the lever 47 from the first key 49 and stopping the second key 50 is only several milli second (ms), while the raised time at the initiation of the movement of the mirror interlocking lever 56 is delayed from such time, there is no trouble even though the mirror interlocking lever 56 is released at the final stage of the rotation of the lever 47.

The supplement of the energy of the biasing spring 51 due to the release of the energy supplementing lever 47 and the operational relationship between the first and second driving levers 44 and 45 and the roller 57 in the descending motion due to the rotation of the lever 56 are the same as in the shutter charging and mirror raising step.

In the motion of the mirror downwardly, the stop lever 60 rotates counterclockwise in response to the movement of the pin 58 on the rotating lever 56, since the biasing force of the spring 61 is stronger than the biasing force at the lens side so that the stop of the lens is fully opened again. In this state, the biasing force on the lens side acts to decelerate the rotation of the mirror interlocking lever 56. FIG. 7 shows the state where the mirror body 1' is retained at its lowered position and is restored to the state where the shutter is not yet charged.

The effect of the stop lever 60 in the raising and lowering operations of the mirror is more significant where the aperture size is smaller. Where the predetermined value is of the fully opened aperture the effect of the lever 60 is negligible in both the raising and lowering operations. Consequently, the maximum deceleration must be considered in the descending step. More supplementing energy is required for lowering the mirror than for raising the mirror. This is different from the first, second and third embodiments. This is controlled by adjusting the contacting-positional conditions of the roller 57 with the first and second driving levers 44 and 45. In other words, the positions of the lever 47, the first driving lever 44 and the second driving lever 45 are adjusted.

The embodiment shown in FIG. 11 is designed to facilitate the manual operation of raising the mirror. This fifth embodiment is a modification of the fourth embodiment and involves a change of the mirror system. For actuating the mirror body 1' separately from the mirror interlocking lever 56', the mirror spring 63 is connected to the mirror body 1' to normally bias the body 1' toward its lowered position, the pin 1'a being urged into engagement with the lever 56'. Consequently, for the operation of the mirror without shutter release, it is necessary to raise the mirror body 1' against the biasing force of the mirror spring 63. However, since the inertia component of the mirror body 1' does not relate with the mirror interlocking lever 56', the potential energy of the spring to be absorbed is less than that absorbed in the showing of the fourth embodiment.

In the type where only a signal to stop the aperture or to fully open the aperture is transmitted to the lens, it is possible to stop automatically in the first, second and third embodiments. In FIGS. 1 through 11, except FIG. 2, the stops 6, 26 and 46 are explained as fixed pins. If the stops are made to be eccentric fixed pins it becomes possible to finely adjust the accelerating region and the decelerating region of the mirror.

Further, in the above explained embodiments, the third biasing spring 8, 8', 28 or 48 acts on the energy supplementing lever 7, 27, or 47. However, the third biasing lever is not always necessary, it only being necessary that the lever 47 be designed to take the first and second deviated positions from the neutral position.

As explained in the foregoing, according to the invention, the kinetic energy for or during the ascension of the mirror is absorbed to utilize it as the energy for driving the mirror down, and the kinetic energy for or during the lowering of the mirror is abosrbed to utilize it as the driving energy for the next frame so that the energy necessary for the winding becomes small whereby the winding up operation of the wind-up lever becomes light and rapid.

Furthermore, since the kinetic energy is absorbed, the shock produced when the mirror is stopped and retained at the uppermost and lowermost positions is decreased, and the noise or sound resulting from the shock is decreased.

By providing with the first driving lever, a second driving lever and a stop, it becomes possible to finely adjust the acceleration and deceleration regions of the mirror movement.

Furthermore, by providing a single spring between the first and second driving levers the spring acts as the first and second biasing springs. Though the supplementation of energy for the descent of the mirror is difficult to obtain from an external source after initiation of the ascent of the mirror this is easily achieved by the provision of the third biasing spring and it is possible to realize the quick return type mirror.

It is also possible to simplify the structure by releasing the second mirror key by the action of the energy supplementing lever.

I claim:

1. In a single lens reflex camera having a mirror movable upwardly and downwardly between raised and lowered positions in response to the opening and closing of the shutter, a mirror driving device comprising:

a. a first mirror holding member to hold the mirror at its lowered position;

b. a second mirror holding member to hold the mirror at its raised position;

c. driving means for applying a biasing force on the mirror for raising the mirror when the mirror is positioned at its lowered position and actuating the mirror by the release of the first mirror holding member, and for applying a biasing force on the mirror for lowering the mirror when the mirror is positioned at its raised position and actuating the mirror by the release of the second mirror holding member, and for accelerating the mirror by discharging the energy due to said biasing force until the actuated mirror passes a neutral position where both biasing forces balance and then decelerating the mirror by absorbing the kinetic energy of the mirror after passing through the neutral position; and d. an energy supplementing member interlocking in operation with said driving means so as to shift the neutral position between a first deviated position with respect to the middle point of the total angular displacement of the mirror by an amount corresponding to the supplement of the energy to compensate for frictional loss during the raising movement of the mirror and a second deviated position with respect to said middle point by an amount corresponding to the supplement of energy to compensate for frictional loss during the lowering movement of the mirror, the energy supplementing member locating at its first deviated position when the mirror is raised and locating at its second deviated position when the mirror is lowered.

2. The mirror driving device according to claim 1, further comprising:

a. a first biasing member for biasing the mirror to the raised direction, and b. a second biasing member for biasing the mirror to the lowered direction.

3. The mirror driving device according to claim 2, further comprising:

a. a first driving member for actuating the mirror by receiving the biasing force of the first biasing member;

b. a second driving member for actuating the mirror by receiving the biasing force of the second biasing member; and c. stop means located between the first driving member and the second driving member for preventing the actuation of both of said driving members for determining the acceleration and deceleration regions of the actuation of the mirror.

4. The mirror driving device according to claim 2, further comprising a third biasing member to bias the energy supplementing member to the second deviated position when the energy supplementing member is positioned at its first deviated position and stores the biasing force when the film for the camera is wound up.

5. The mirror driving device according to claim 1, further comprising:

a. a first dirving member provided on the energy supplementing member to accelerate the mirror when the mirror moves from its lowered position to the neutral position and to decelerate the mirror when the mirror moves from the neutral position to the lowered position;

b. a second driving member provided on the energy supplementing member to decelerate the mirror as it moves from the neutral position to its raised position and to accelerate the mirror as it moves from the raised position to the neutral position;

c. biasing means located between the first and second driving members to bias the first driving member in the direction for raising the mirror and to bias the second driving member in the direction for lowering the mirror; and d. a stop fixed to the energy supplementing member and positioned between the first and second driving members for preventing the movement of the driving members for determining the acceleration and deceleration regions of the mirror movement.

6. The mirror driving device according to claim 5, further comprising an energy supplementing member biasing means for biasing the energy supplementing member toward the second deviated position as the supplementing member is positioned at the first deviated position and for storing the biasing force when the film is wound up.

7. The mirror driving device according to claim 1, further comprising:

a. a mirror interlocking member which is positioned at a first position as the mirror is positioned at the lowered position and is positioned at a second position as the mirror is positioned at the raised position;

b. a first driving member provided on the energy supplementing member for interlocking with the mirror interlocking member for accelerating the mirror as it moves from the lowered position to the neutral position and for decelerating the mirror as it moves from the neutral position to its lowered position;

c. a second driving member provided on the energy supplementing member for interlocking with the mirror interlocking member for decelerating the mirror as it moves from the neutral position to the raised position and for decelerating the mirror as it moves from the raised position to the neutral position;

d. biasing means located between the first and second driving members for biasing the first driving member in the direction for raising the mirror and for biasing the second driving member in the direction for lowering the mirror; and e. a stop located between the first and second driving members for preventing the movement of the driving members for determining the acceleration and deceleration regions of the movement of the mirror.

8. The mirror driving device according to claim 7, further comprising means for biasing the energy supplementing member toward the direction of the second deviated position as the member is positioned at its first deviated position and for storing the biasing force as the film is wound up.

9. In the mirror driving device according to claim 8, wherein the mirror interlocking member comprises a stop lever, interlocking means engageable with the stop lever for actuating stop blades of the phototaking lens to open the blades as the interlocking member is positioned at the first position and for actuating the stop lever for stopping the blades by a predetermined amount as the interlocking member is positioned at its second position.

10. In the mirror driving device according to claim 1, wherein the energy supplementing member comprises a release portion engageable with the second mirror holding member for releasing the mirror from engagement with the second mirror holding member at the end of movement from the second deviated position to the first deviated position.

* * * * *

UNITED STATES PATENT OFFICE
CERTIFICATE OF CORRECTION

Patent No. 4,091,399     Dated May 23, 1978

Inventor(s) Sachio Ohmori

It is certified that error appears in the above-identified patent and that said Letters Patent are hereby corrected as shown below:

Figure 2 should be included in the drawings as shown on the attached sheet.

Signed and Sealed this

Twelfth Day of December 1978

[SEAL]

Attest:

RUTH C. MASON
Attesting Officer

DONALD W. BANNER
Commissioner of Patents and Trademarks